March 10, 1964     V. B. CETRONE     3,124,267
METHODS OF AND MEANS FOR SEALING CONTAINERS
Filed June 16, 1961     3 Sheets-Sheet 1
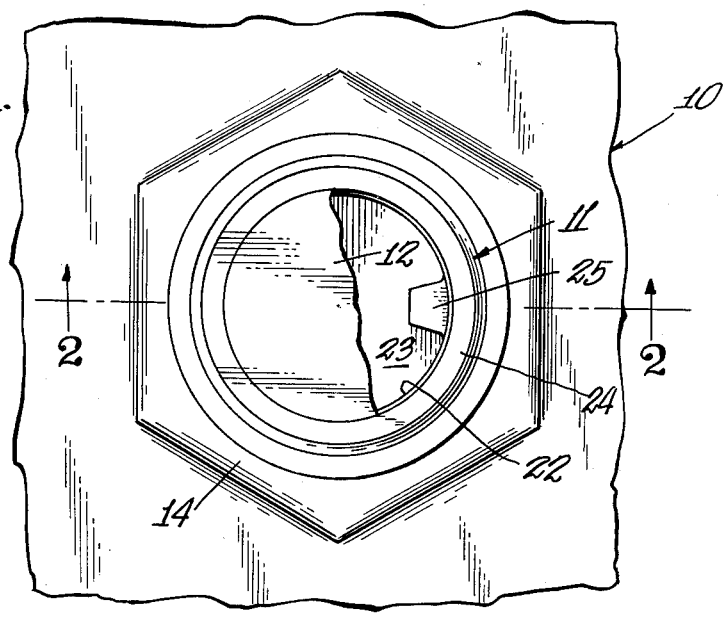
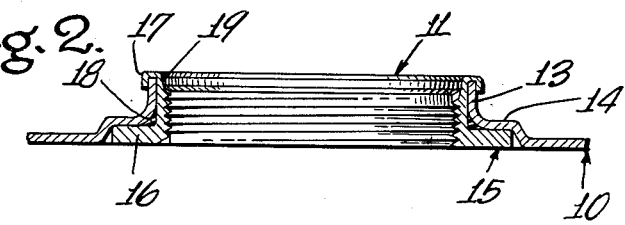
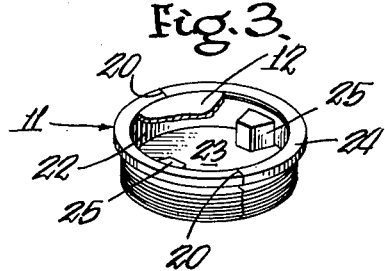
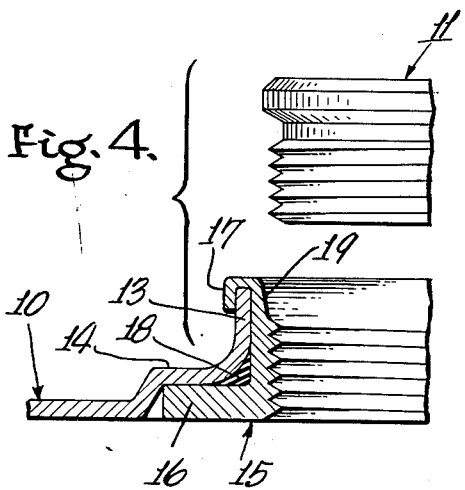
INVENTOR.
Vincent B. Cetrone
BY
*Michael Williams*
ATTORNEY March 10, 1964  V. B. CETRONE  3,124,267
METHODS OF AND MEANS FOR SEALING CONTAINERS
Filed June 16, 1961  3 Sheets-Sheet 2
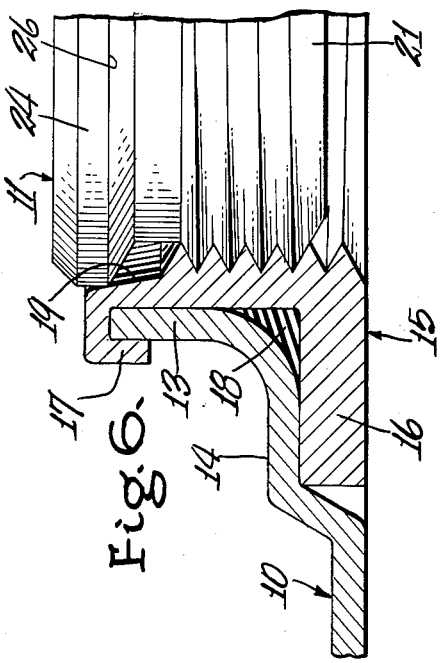
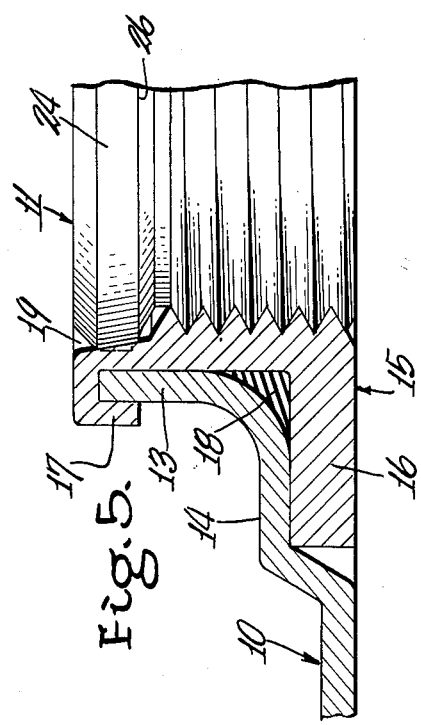
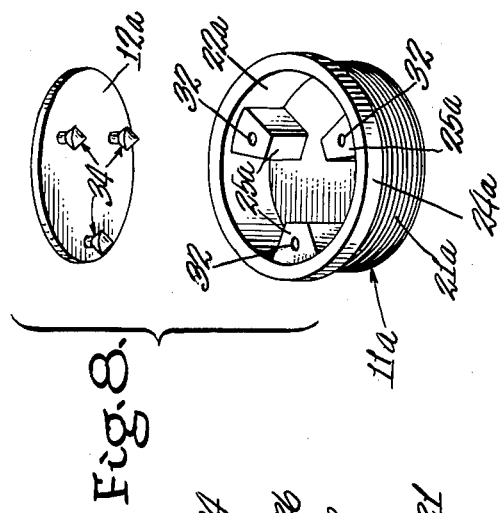
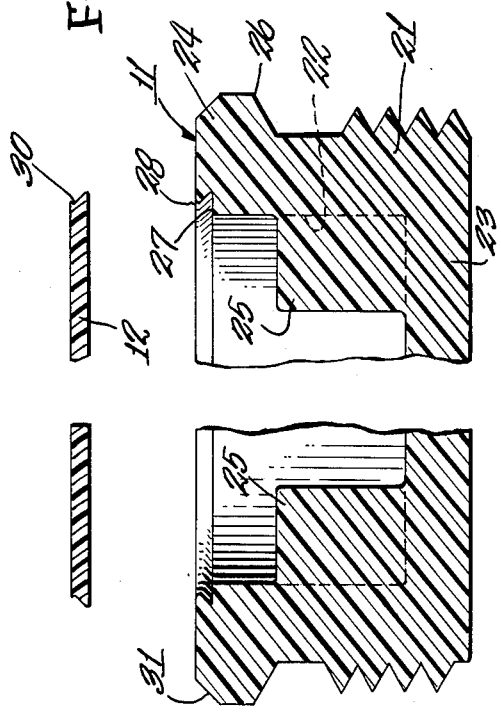
INVENTOR.
Vincent B. Cetrone
BY
*Michael Williams*
ATTORNEY

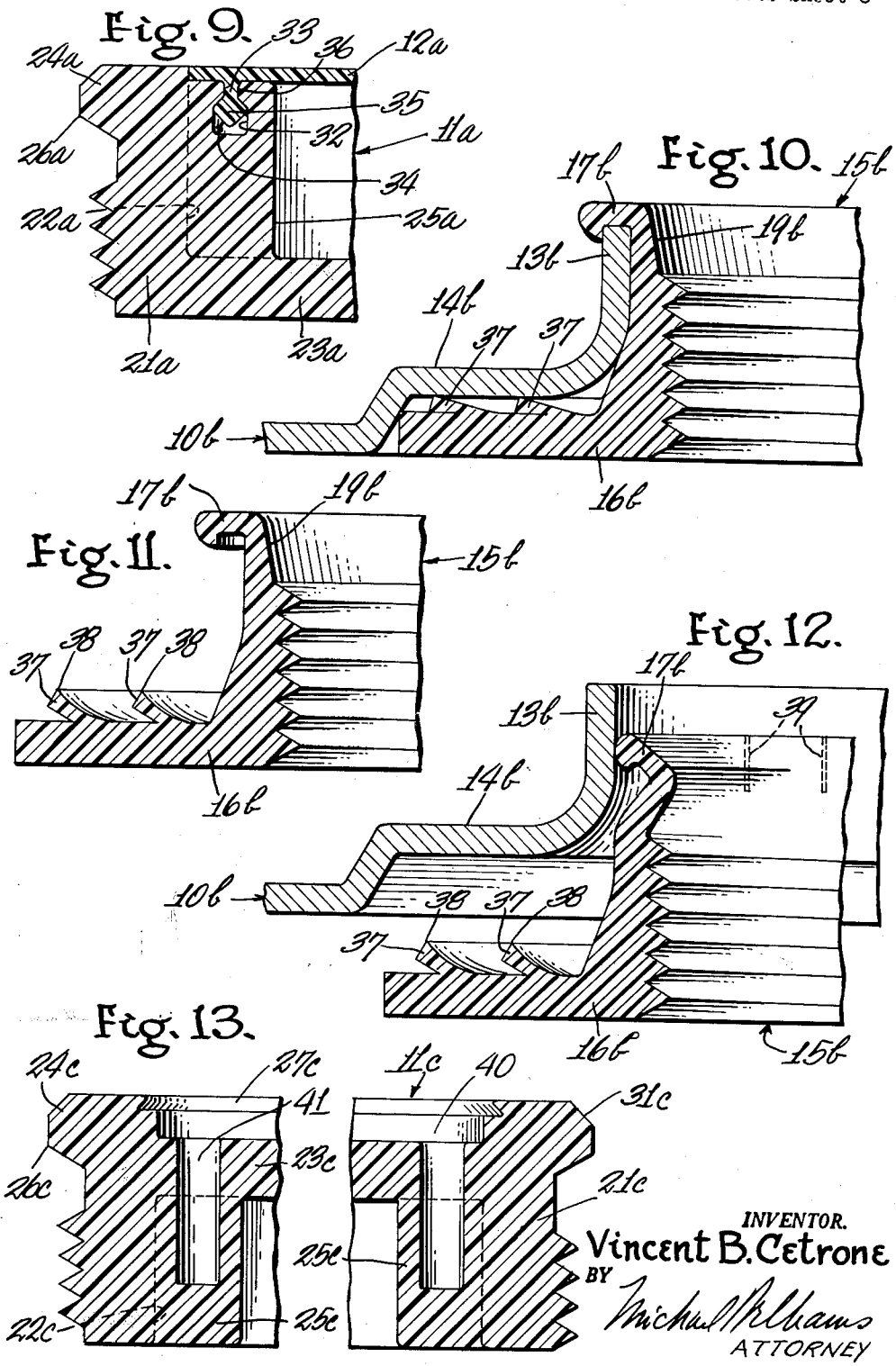

United States Patent Office 3,124,267
Patented Mar. 10, 1964

3,124,267
METHODS OF AND MEANS FOR
SEALING CONTAINERS
Vincent B. Cetrone, 563 Adelaide NE., Warren, Ohio
Filed June 16, 1961, Ser. No. 127,424
6 Claims. (Cl. 220—39)

The present invention relates to methods of and means for sealing an opening in a container and the like and the principal object of the invention is to provide new and improved methods and means of such character.

Heretofore, there have been attempts to seal the opening of a container by means of a plug formed of resilient resinous material. The use of such a plug appears quite promising since this non-metallic material possesses several very desirable properties: Firstly, the material is non-sparking and thus is quite advantageous where containers carry inflammable, highly volatile fluids. Secondly, the material withstands many substances which will harm untreated metal plugs. Thirdly, since the material is resilient, a plug made thereof can be made to serve as its own gasket thus reducing costs. Fourthly, plugs may be molded of resilient, resinous material at considerable cost savings over comparable metallic plugs.

Despite the above-enumerated advantages, prior art attempts to provide plugs of resilient, resinous material have had but little success for a variety of reasons. For one, a relatively soft material was used, in order to provide a reasonably effective, gasket-less seal. Unfortunately, however, plugs made of such material were unable to withstand the elevated temperatures of certain manufacturing process. Another deficiency was that plugs frequently commenced leaking, for no apparent reason, sometime after they were seated in place. Because of this leakage, expensive secondary seals were often found to be necessary. A principal factor involved in the leakage aforesaid was that the material used was relatively soft and therefore had rather poor creep strength under stress. Accordingly, while sufficient pressure could be exerted to effectuate an initial seal, such pressure would ultimately lessen to the point where sealing was ineffective.

By means of a novel approach, gasket-less sealing is effectuated by the present invention even though a much harder material than was heretofore used is employed. Not withstanding this use of a much harder material having a much higher creep strength and a much higher temperature tolerance, sealing is accomplished without subjecting threads formed in the plug to extremely heavy shearing stresses. Furthermore, the invention provides a materially lower cost tamper-proof structure together with a container opening sleeve which is not only lower in cost than those in present use but which can be much more economically installed. These and other advantages of the present invention will readily become apparent from a study of the following description and from the drawings appended hereto.

In the drawings accompanying this specification and forming a part of this application there is shown, for purpose of illustration, embodiments which the invention may assume, and in these drawings:

FIGURE 1 is a fragmentary, broken, top plan view of a container having a selectively closeable opening, FIGURE 2 is a sectional view generally corresponding to the line 2—2 of FIGURE 1, FIGURE 3 is a reduced size perspective view of the closure plug assembly seen in FIGURES 1 and 2, a portion of the assembly being broken away to show underlying structure, FIGURE 4 is an enlarged fragmentary view, similar to FIGURE 2, but showing the closure plug separated from the container opening, FIGURE 5 is a further enlarged view, similar to FIGURE 4, but showing the closure plug fully seated in the container opening, FIGURE 6 is a view similar to FIGURE 5 but showing the closure plug prior to being fully seated in the container opening, FIGURE 7 is a broken, exploded sectional view of the plug seen in FIGURES 1 through 6 together with a tamper-proof seal therefor, FIGURE 8 is a reduced size, exploded perspective view of a modified plug and tamper-proof seal, FIGURE 9 is an enlarged, fragmentary sectional view of the assembled plug and seal seen in FIGURE 8, FIGURE 10 is a fragmentary sectional view of a modified container opening assembly, FIGURE 11 is a view of a detail seen in FIGURE 10 but prior to assembly with the container, FIGURE 12 is a view similar to FIGURE 10 but at an intermediate stage of assembly, and FIGURE 13 is a broken, sectional view of a modified plug particularly adapted for use with the assembly seen in FIGURE 10.

With reference to FIGURES 1 and 2, there is fragmentarily shown a relatively thin-walled container 10 which may, for example, be a 55 gallon drum of the well-known type. Such container has an internally threaded opening closed by a removable, externally threaded plug 11. As will later be disclosed in detail, a disk-like member 12 discourages tampering with the container contents since the plug cannot be removed without first destroying the member and thus such tampering may readily be detected.

In the usual construction of these containers, the container wall portion defining the container opening has an outwardly projecting, annular neck 13. For a purpose to appear, a non-circular embossment 14, herein shown to be hexagonal, is formed in the wall concentric with the neck 13. Extending through the container neck 13 is a sleeve member 15 having a lower, in the position of parts viewed, outwardly flanged portion 16 seated within the container embossment 14. Flange portion 16 is formed for complementary engagement with the container embossment 14 so as to key the parts together against relative rotation.

The upper portion of sleeve member 15 is turned radially outwardly over the free end of the container neck 13 at 17 to lock the sleeve in position. A gasket 18 is interposed between the sleeve and the container neck to insure against leakage therebetween and the interior of the sleeve is threaded to receive the externally threaded plug 11. It is to be particularly noted that the upper end of the sleeve 15 has an annular, tapered, funnel-like mouth portion 19 (see also FIGURE 4) which is utilized in a novel manner as will later appear. For reasons to appear, sleeve portion 19 thus provides an annular seat (which in the disclosed embodiment is a straight taper, although any other suitable taper may be utilized) whose largest diameter portion is adjacent the exterior of the container and whose smallest diameter portion is adjacent the interior of the container.

It is to be understood that the construction of the container as thus far described is quite conventional, the present invention residing, in the first to be disclosed embodiment, in a novel plug which cooperates with the conventional container to provide highly beneficial results.

As earlier discussed, previous attempts to make the plug 11 from so-called plastic material with the object of eliminating the usual sealing gasket necessitated when the sealing plug is made of metal, have not been entirely successful. Broadly stated, this lack of success was due to the fact that prior art plugs were designed to provide a relatively large plug area (i.e., a relatively wide annular portion) in sealing contact with sleeve member 15. Since the sealing area was large, a leak-proof seal could only be effectuated by making the plug from relatively soft material and/or by using excessive pressures to seat the plug. Neither of these expedients has been entirely satisfactory.

Compounding the sealing problem of prior art plugs was the fact that since they were formed by the highly efficient, injection molding process, each had a slightly raised line of material resulting from the joint between the two parts of the mold. A raised line of the type above-mentioned is shown at 20 in FIGURE 3 and since such line extended the full width of the relatively wide, annular plug portion which was supposed to seal against the sleeve member, the very length of such line on opposed sides of the plug tended to prevent such portion from sealing tightly against the sleeve.

As best seen in FIGURES 3, 4 and 7, the plug therein illustrated has an externally threaded body portion 21 cooperable with the internally threaded sleeve 15. The outer or upper portion of the plug has a central recess 22 terminating in an inner wall 23. As illustrated, the plug threads terminate short of its outer end, the latter having a radially outwardly extending annular shoulder 24 later to be described in greater detail. Structurally integral with the plug are lugs 25 herein shown to be two in number and disposed in opposed relation within the plug recess 22. Lugs 25 preferably terminate short of the mouth of recess 22 at the upper end of the plug for a purpose to appear. As best seen in FIGURE 7, the inner or lower margin of flange 24 terminates in an annular knife-like edge 26, having a diameter smaller than the largest diameter portion of the sleeve seat 19 but larger than the smaller diameter portion thereof, which is adapted to engage with sleeve seat 19 to effectuate a leakproof seal as will appear.

Although many suitable techniques may be employed to form the plug of various types of plastics, it is preferable at the present time to employ the injection molded technique and to employ a thermoplastic resin known as acetal. This material is strong and tough, resists heat well, is resistant to most solvents, is easily formed, and has high fatigue resistance. Presently, acetal is commercially available from E. I. du Pont de Nemours & Co., Inc., under the trademark "Delrin." Other plastics of which the plug may be made are nylons and poly carbonates, the latter being commercially available from the General Electric Co., under the trademark "Lexan." The above material examples are intended to be illustrative only, it being understood that other plastic materials possessing the required properties to the necessary degree consistent with the intended use can also be employed.

With reference now to FIGURE 6, the container opening will be closed, for example, after the container is filled, by screwing plug 11 into the sleeve 15 until the plug flange 24 engages the mouth of the sleeve opening. It is of particular importance that the annular knife edge 26 of the flange first engages the tapered, annular seat portion 19 of the sleeve intermediate its largest and smallest diameter portions thereof. A suitable wrench (not shown) will then be inserted into the plug recess 22 for engagement with the plug lugs 25 and the plug then screwed further into the sleeve to the position seen in FIGURE 5.

As the plug is screwed in, knife edge 26 slides down the tapered surface 19 and is subjected to tremendous compressive pressure which ensures a leak-proof seal. Note the distortion of the knife edge in FIGURE 5 from its original, phantom line position. The effectiveness of the seal between the plug 11 and the sleeve 15 stems from the fact that sealing pressure therebetween is concentrated at the knife edge of the plug and thus extremely high sealing pressure between the areas in contact with each other is obtained without subjecting the entire body of the plug to heavy stresses. This is in stark contrast with prior art plugs wherein a relatively large area thereof was in sealing engagement with the sleeve and therefore the necessary sealing pressures could only be obtained by subjecting the entire plug to excessive pressure. By the expedient of forming the present plug with a very narrow seat, i.e., the knife edge, the plug may be made of quite hard plastic material having certain very desirable properties without requiring the plug to be screwed in under excessive pressure and without a reduction in sealing efficiency.

Means are provided to insure that if an unauthorized attempt is made to tamper with the contents of the container, as by removing or attempting to remove plug 11, such attempt will readily be discernable. For this purpose and as viewed in FIGURE 7, an annular groove 27 is formed at the mouth of the plug recess 22. The outer defining margin of this groove is inclined as shown, and is rounded at 28 for a purpose to appear.

Adapted to seat in the groove 27 is the previously mentioned disk 12 preferably formed of the same plastic material as the plug 11 although other suitable materials may also be used. The periphery of disk 12 is formed complementary to the groove 27 tightly fit therein, the disk preferably being flushed with the outer surface of the plug, when seated in its groove, so as to present no opening into which a tool could be inserted to pry the disk from its position. Note the lip 30 on the outer periphery of disk 12 which closely fits with the rounded margin 28 of the groove periphery to present as small an opening as possible when the disk is seated in the groove.

Once the plug is screwed into position as seen in FIGURE 5, the disk will be pressed into its groove by simple hand pressure. This may readily be accomplished since the disk is rather flexible, the operation being facilitated by the previously mentioned, rounded groove margin 28. Because of the configuration of the groove 27 and the periphery of the disk, the latter can only be seated in its groove in one position; i.e., it cannot be inverted and then seated therein. Accordingly, any indicia carried by the outside surface of the disk will be visible.

With the disk 12 seated in position in the plug groove 27, it will be understood that access to the plug recess 22 will be blocked. Accordingly, a wrench cannot be engaged with the plug lugs 25 to provide for removal of the plug from the container opening. Further insuring that no grip can be obtained on the screwed-in plug, its flange 24 will be beveled at 31.

To remove the plug from the container following assembly of the disk 12 therewith as above described, it is necessary to first remove the disk by piercing it with a sharp tool and prying it from position or by shattering the disk with a blow. Access to the plug recess will then be obtained so that the plug wrench can be employed to unscrew the plug. In any event, removal of the disk 12 from the plug can only be effectuated by destroying the disk and thus unauthorized tampering with the plug will readily be visible.

In the embodiment seen in FIGURES 8 and 9 wherein similar parts are identified with the same reference characters as before but with the suffix "a" added, a somewhat different tamper-proof seal is employed. In this embodiment, the groove at the mouth of the plug recess 22a is omitted and at least one additional wrench engaging lug 25a is used, such lugs preferably being equally spaced from each other within the plug recess. Each lug 25a terminates just short of the mouth of the plug recess 22a and each has a pocket 32 having a reduced-size mouth 33 (see FIGURE 9).

The tamper-proof disk 12a is proportioned to closely fit within the plug recess 22a and is adapted to be flush with the exterior of the plug (FIGURE 9) when it is seated upon respective plug lugs 25a. Projecting from the disk surface facing the plug, are structurally integral projections 34 cooperable with respective lug recesses 32. Each projection has its free end enlarged at 35 to fit within a respective recess 32 and a reduced size neck portion 36 for passing through the reduced size mouth 30 of its recess.

The use of plug 11a is similar to plug 11 in that it will be screwed into the container opening to close the latter by means of a suitable wrench which engages the plug lugs 25a. Disk 12a will then be seated in the plug recess 22a by forcing the disk projections 34 into respective lug recesses 32 (FIGURE 9), it being understood that the plastic of which the disk is made is sufficiently resilient to permit the projections to spring past the reduced size recess mouths 33.

Once the disk 12a is assembled with the plug as shown in FIGURE 9, wrench engagement with the latter is barred thus effectively preventing removal of the plug from the container. To remove the plug, it will be necessary to first pierce the disk and then pry it out or fracture the latter with a sharp blow so as to gain access to the plug lugs. In any event, removal of the disk 12a will result in its destruction so that unauthorized tampering with the plug will readily be visible.

With reference now to FIGURE 10, it is an object of the present invention to replace the heretofore used metal sleeve members 15 with sleeve members made of suitable plastic material such as nylon to markedly reduce the cost of the assembly. This is accomplished by greatly simplifying assembly procedures and the equipment required for such assembly.

As viewed in FIGURE 10 therein similar parts are identified with the same reference characters as before, but with the suffix "b" added, the container will be initially formed in a manner similar to present practise; i.e., with an outwardly projecting, annular neck 13b and a non-circular embossment 14b. The novel sleeve member 15b is quite similar in appearance to the metal one commonly in use and heretofore described; however, assembly procedures differ. Sleeve member 15b has a lower, radially outwardly extending flange portion 16b which is formed for complementary engagement with the embossment 14b for seating therein. The inside of the sleeve member 15b is, of course, threaded as before and the upper end of the member has a radially outwardly extending flange 17b engaged over the free end of the container neck 13b. Like the sleeve 15, sleeve 15b has an annular, tapered, funnel-like mouth portion 19b which functions with the previously described plug to provide a fluid-tight seal as hereinabove described.

A unique feature of sleeve 15b, apart from the material of which it is made, is that the upper surface of flange 16b is formed with a pair of integral, concentric ribs 37 which engage with the underside (interior) of the container embossment 14b to effectuate a fluid-tight seal between the sleeve and the container. With reference to FIGURE 11 wherein the sleeve 15b is shown prior to its installation with the container, it will be seen that each rib 37 is dished to provide an upwardly facing, knife-like annular edge 38 for a purpose to appear.

To assemble sleeve 15b with the container and with reference to the position of parts shown in FIGURE 12, the upper end of the sleeve is inserted into the lower end of the container neck and sufficient pressure applied to force the sleeve into the neck as illustrated. Note that because of the flexibility of the plastic sleeve, its upper end will bend radially inwardly to permit passage thereof through the relatively narrow neck. The sleeve will be pressed into the container neck until the edges 38 of the ribs 37 press tightly against the underside of the container embossment 14b to effect a fluid-tight seal therewith and until the flange 17b emerges from the free end of the container neck and snaps radially outwardly to engagement therewith. The sleeve will thus be retained in assembled relation with the container. It is to be noted that the ribs 37 are flattened when the parts are assembled as seen in FIGURE 10, the resiliency of the ribs maintaining the rib edges 38 constantly pressed against the underside of the container embossment for sealing purposes. While not essential, assembly of the sleeve with the container may be facilitated by slotting the upper end of the latter at spaced places as seen in phantom at 39 in FIGURE 12 to increase flexibility of the sleeve.

While the plugs previously described may be threaded into the sleeve 15b, following its assembly with the container, in order to close the container opening, it is preferable to employ the somewhat modified plug seen in FIGURE 13 for reasons to appear.

With reference to the last mentioned figure wherein similar parts are identified by the same reference characters as before but with the suffix "c" added, recess 22c has been inverted so that it opens down (toward the inside of the container) rather than up (to the outside of the container) thus disposing the wall 23c close to the outside face of the plug. A shallow recess 40, however, is provided at the upper (outside) face of the plug and at the mouth thereof is the disk receiving groove 27c.

Since the lugs 25c are not accessible for engagement with a wrench from the exterior of the plug, an elongated opening 41 extends from the bottom of recess 40 into each lug 25c, terminating short of the bottom thereof. A suitable spanner wrench, having pegs insertable into respective openings 41, will be employed to screw the plug into and out of the previously described sleeve 15b. A disk identical to the one seen in FIGURE 7 will be employed to render plug 11c tamper-proof.

With the plug constructed as seen in FIGURE 13; that is, with the inwardly facing recess 22c, any pressure within the container closed by this plug will tend to expand the lower body portion of the plug radially outwardly. This will, in turn, exert a radially outwardly directed force on the sleeve 15b which, since it is somewhat flexible, will expand radially outwardly into tight sealing engagement with the interior of the container neck 13b. Such expansion of the sleeve into tight engagement with the container neck will provide a seal in addition to that provided by the ribs 37 to further insure against leakage between the container and the member.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. The combination comprising a container having an internally threaded opening and a tapered annular seat circumscribing such opening with the largest diameter portion of said seat being adjacent the exterior of said container and with the smallest diameter portion of said seat being adjacent the interior of said container, an externally threaded plug for closing said container opening and adapted to be threaded into the latter from the container exterior, and means on said plug to establish a fluid-tight seal with the container and providing an annular, knife-like edge having a diameter smaller than the largest diameter portion of said container seat but larger than the smallest diameter portion of said container seat and said knife-like edge forceably engaging said container seat intermediate the aforesaid largest and smallest diameter portions thereof as said plug is threaded tightly into said container opening, said means being of a material sufficiently rigid to resist flowing under the pressure exerted by tightening said plug in said container opening but such material being softer than said container seat to provide for slight deformation of said knife-like edge as a result of the high pressure per unit of area developed thereon when said plug is so tightened.

2. The construction of claim 1 wherein said means comprises a radially outwardly extending annular shoulder integral with said plug.

3. The construction of claim 2 wherein said plug is formed of resilient resinous material.

4. The construction of claim 2 wherein said plug is formed of acetal plastic material.

5. The combination comprising a container having an internally threaded opening and a tapered annular seat circumscribing such opening with the largest diameter portion of said seat being adjacent the exterior of said container and with the smallest diameter portion of said seat being adjacent the interior of said container, a plug having an externally threaded shank portion for threaded engagement with said container opening, a radially enlarged head portion at the end of said plug shank portion adjacent the exterior of said container providing an annular, knife-like edge on the side of said head facing the interior of said container, said edge having a diameter smaller than the largest diameter portion of said container seat but larger than the smallest diameter portion of said container seat and said knife-like edge forceably engaging said container seat intermediate the aforesaid largest and smallest diameter portions thereof as said plug is threaded tightly into said container opening, and an integral, intermediate plug portion connecting said plug head and shank portions and extending from said plug shank portion for termination substantially at said knife-like annular edge for bracing the latter against undue deflection when said plug is tightened in said container opening.

6. The construction of claim 5 wherein said annular knife-like edge is formed at the juncture of said plug head and said plug intermediate portions.

References Cited in the file of this patent

UNITED STATES PATENTS

| | | |
|---|---|---|
| 1,982,145 | Shera | Nov. 27, 1934 |
| 2,243,290 | Schwartz | May 27, 1941 |
| 2,299,281 | Sample | Oct. 20, 1942 |
| 2,628,264 | Esher | Feb. 10, 1953 |
| 2,772,017 | Rieke | Nov. 27, 1956 |
| 2,842,282 | Parish et al. | July 8, 1958 |